US006916514B2

(12) United States Patent
Bringley et al.

(10) Patent No.: US 6,916,514 B2
(45) Date of Patent: Jul. 12, 2005

(54) CATIONIC SHELLED PARTICLE

(75) Inventors: Joseph F. Bringley, Rochester, NY (US); Katherine M. Broadus, Rochester, NY (US); Lori Shaw-Klein, Rochester, NY (US); Gary N. Barber, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 94 days.

(21) Appl. No.: 10/622,230

(22) Filed: Jul. 18, 2003

(65) Prior Publication Data

US 2005/0014000 A1 Jan. 20, 2005

(51) Int. Cl.[7] .................................................. B41M 5/40
(52) U.S. Cl. .............................. 428/32.35; 428/32.36; 428/32.37; 428/403; 428/407
(58) Field of Search .................. 428/403, 407, 428/32.35, 32.36, 32.37

(56) References Cited

U.S. PATENT DOCUMENTS

| 5,139,915 | A | * | 8/1992 | Moffat et al. |
| 5,372,884 | A | | 12/1994 | Abe et al. |
| 5,576,088 | A | * | 11/1996 | Ogawa et al. |
| 6,403,526 | B1 | * | 6/2002 | Lussier et al. |
| 6,475,603 | B1 | * | 11/2002 | Wexler |
| 6,479,146 | B1 | * | 11/2002 | Caruso et al. |
| 6,630,212 | B2 | * | 10/2003 | Bermel et al. |
| 6,645,582 | B2 | * | 11/2003 | Sadasivan et al. |
| 6,770,336 | B2 | * | 8/2004 | Wang et al. |
| 6,818,685 | B1 | * | 11/2004 | Chapman |

OTHER PUBLICATIONS

Journal of American Chemical Society, 1998, vol. 120, pp. 8523–8524.

* cited by examiner

Primary Examiner—H. Thi Le
(74) Attorney, Agent, or Firm—Paul A. Leipold

(57) ABSTRACT

The invention relates to a cationic shelled particle comprising a colloidal alumina core having a median diameter of between 20 and 2000 nm and a positive charge, a layer on the surface of said core particle having a negative charge and comprising particles of a median diameter of less than 30% of the median diameter of said core particle, and an outer layer of positive charge.

34 Claims, No Drawings

CATIONIC SHELLED PARTICLE

FIELD OF THE INVENTION

The invention relates to cationic, multiple-shell, core-shell particles having a colloidal alumina core, and to inkjet recording elements prepared from such particles. The invention further relates to inkjet recording elements containing core/shell particles with improved fade resistance.

BACKGROUND OF THE INVENTION

A dispersion consists of a mixture of small solid particulates in a solvent, such as water. The dispersion is said to be a stable colloid if the solid particulates are sufficiently small and homogeneous such that they do not rapidly aggregate and settle from suspension, usually for a period of many days. Such suspensions are often referred to as "colloids" and are useful in many applications. It is the surface properties of the particulates, such as their electrostatic charge, which is responsible for the stability of colloids. Typically the surfaces are significantly charged, positive or negative, so as to provide electrostatic repulsion to overcome forces which would lead to the aggregation and settling of the colloid. In recent years, it has been of interest to surface modify particles, or to "assemble" smaller colloidal particles of opposite charge onto larger core particles to achieve specific properties. However, this is often difficult since the surface modification or assembly disrupts the electrostatic and steric forces necessary for colloidal stability, and stable colloids are not easily obtained, although examples are known. U.S. Pat. No. 5,372,884 describes a cation-modified non-spherical colloidal silica, wherein the cation-modifier is at least one hydrous metal oxide selected from the group consisting of hydrous aluminum oxide, hydrous zirconium oxide and hydrous tin oxide, and the use of the particles in ink-jet media.

It is even more difficult to produce core-shell particles having multiple-shell layers, since aggregation of the particles becomes a limiting factor. Aggregation leads to colloidal instability and may typically be avoided only if very dilute suspensions (less than 1% by weight) are employed. Caruso et al. (J. Amer. Chem Soc. 120, 8523 (1998)) describe a method for preparing nanoparticle-shell multilayers upon larger latex (polystyrene) core particles. A layer-by-layer technique is described in which oppositely charged nanoparticles or polymeric species are sequentially absorbed to the core particle. The technique requires that the core particles be added to a large excess of the shelling polymer or particles and that the unabsorbed fraction (or excess) be removed be repeated centrifugation and wash cycles. Only then is a second shell-layer applied and centrifugation and washing repeated. This method is tedious, requires considerable time and is typically only applicable to dilute (less than about 5 wt %) systems.

Another problem is that multiple-shell, core-shell particles are limited to only a relatively few types of core particles, typically silica particles and organic latexes. This greatly limits the number of chemical structures that can be produced since silica and latex core particles may only be obtained in limited size ranges, and generally only spherical particle shapes are widely available at low cost. Further, the size and shape of such colloids are not well suited to specific applications such as inkjet receivers, described below. There is a need for core-shell colloids having core particles chemically distinct from silica and latex particles, and methods to modify such particles so that core-shell particles having multiple-shells may be produced, having specific particle sizes and particle shapes. The present invention describes cationic, multiple-shell particles comprising a colloidal alumina core. The surfaces of the particles are chemically functionalized with a variety of materials, and the resulting multiple-shell, core-shell particles are stable colloids having high concentrations.

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water and an organic material such as a monohydric alcohol, a polyhydric alcohol or mixtures thereof.

An inkjet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of inkjet recording elements is their need to dry quickly after printing. To this end, porous recording elements have been developed which provide nearly instantaneous drying as long as they have sufficient thickness and pore volume to effectively contain the liquid ink. For example, a porous recording element can be manufactured by coating in which a particulate-containing dispersion is applied to a support and is dried. The precise size and shape of the particulates is important since it is desired to achieve both high porosity and high gloss in the coated layer. Large particles (greater than about 500 nm) give coatings with high porosity but low gloss, whereas small particles (less than about 100 nm) give low porosity but high gloss.

When a porous recording element is printed with dye-based inks, the dye molecules penetrate the coating layers. However, there is a problem with such porous recording elements in that the optical densities of images printed thereon are lower than one would like. The lower optical densities are believed to be due to optical scatter which occurs when the dye molecules penetrate too far into the porous layer. Another problem with a porous recording element is that atmospheric gases or other pollutant gases readily penetrate the element and lower the optical density of the printed image causing it to fade.

PROBLEM TO BE SOLVED BY THE INVENTION

There is a need for multiple-shell, core-shell colloids having core particles chemically distinct from silica and latex particles, and methods to modify such particles so that core-shell particles having multiple-shells may be produced. There is a further need for core-shell colloids having particle sizes and shapes suitable for inkjet applications and having surface modifications capable of providing improved resistance to image fade.

SUMMARY OF THE INVENTION

It is an object to provide colloidally stable, multiple-shell, core-shell colloids with particle sizes suitable for inkjet media applications.

It is a further object to provide inkjet recording elements prepared from such particles with improved fade resistance.

These and other objects of the invention are accomplished by providing a cationic shelled particle comprising a colloidal alumina core having a diameter of between 20 and 2000 nm and a positive charge, a layer on the surface of said core particle having a negative charge and comprising particles of a diameter of less than 30% of the diameter of said core particle, and an outer layer of positive charge.

ADVANTAGEOUS EFFECT OF THE INVENTION

The invention provides cationic, multiple-shell, core-shell particles having a colloidal alumina core, which are stable colloids having particle sizes suitable for inkjet media applications. Inkjet recording elements prepared from such particles exhibit improved fade resistance.

DETAILED DESCRIPTION OF THE INVENTION

The invention has numerous advantages such as providing cationic, multiple-shell, core-shell particles having a colloidal alumina core, which are stable colloids having particle sizes suitable for inkjet media applications. Ink-jet recording elements prepared from such particles exhibit improved fade resistance. These and other advantages will be apparent from the detailed description below.

Colloidal particles find use in a broad variety applications such as pigments for paints, as thickeners and coating aids, in cosmetic products, in paper products, and as polishing media in semiconductor electronics, to name only a few. An application of particular importance is the use of colloids in the production of inkjet paper and media. It is often desired to modify the surfaces of colloidal particles to obtain a specific chemical function or to impart a desired physical property to the colloidal particles. Because the surface area of colloidal particles is generally very high, the surface properties play an important role in the application of colloidal particles. Surface modification of colloidal particles may be achieved through the preparation of core-shell particles. Because the shelling species is at the surface, the chemical and physical properties of the core-shell are determined by the nature of the shell species. Thus, core particles may be chosen based upon availability and low cost and can serve as carriers for more expensive and chemically complex shell materials. This approach greatly lowers the cost of the material, since it may be difficult or even impossible to obtain colloidally stable shell materials of desired particle size. It is desired that the core-shell colloid be inexpensive, homogeneous and colloidally stable to facilitate its application in products and devices.

In a typical inkjet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water and an organic material such as a monohydric alcohol, a polyhydric alcohol or mixtures thereof.

An inkjet recording element typically comprises a support having on at least one surface thereof an ink-receiving or image-receiving layer, and includes those intended for reflection viewing, which have an opaque support, and those intended for viewing by transmitted light, which have a transparent support.

An important characteristic of inkjet recording elements is their need to dry quickly after printing. To this end, porous recording elements have been developed which provide nearly instantaneous drying as long as they have sufficient thickness and pore volume to effectively contain the liquid ink. For example, a porous recording element can be manufactured by applying a coating of a particulate-containing dispersion to a support and then drying. The precise size and shape of the particulates is important since it is desirable to achieve both high porosity and high gloss in the coated layer. Large particles (greater than about 500 nm) give coatings with high porosity but low gloss, whereas small particles (less than about 100 nm) give low porosity but high gloss.

When a porous recording element is printed with dye-based inks, the dye molecules penetrate the coating layers. The water dries from the ink leaving behind a dried dye image. The dye is then contained in close proximity to the particulates which comprise the image-receiving layer. Chemical interactions between the particle surfaces and the dye can strongly influence the lifetime of the image, since oxygen and other oxidizing gases may adsorb to the particle surfaces. It is generally desired that the interactions between the dye and the particle surfaces be manipulated so as to provide maximum fade resistance and thus increase the image lifetime. It is an object of this invention to provide colloidally stable, multiple-shell, core-shell colloids with particle sizes suitable for ink-jet media applications. It is a further object to provide inkjet recording elements prepared from such particles with improved fade resistance.

Colloidal alumina core particles suitable for the practice of the invention have the general formulas $Al_2O_3$, $.Al_2O_3nH_2O$ in which n is 1 or more preferably n is 1 to 9, and AlO(OH). These are selected from alumina and hydrous forms of alumina and are also known by their mineral names such as boehmite, bayerite, diaspore, corundum and gibbsite. The alumina core particles should provide stable colloids when dispersed in water, as indicated by a highly positive zeta potential of between about +20 mv to +70 mv at a pH of between about 2 to 6. The median size of the core particles may be from about 20 nm to about 2000 nm, but it is preferred that the core median particle size be between about 50 and 500 nm. This size range is preferred because it provides for greater colloidal stability and further because it is well suited for application in inkjet media. For non-spherical core particles, the particle size may be adequately described by the equivalent spherical diameter.

The layer immediately adjacent to the surface of the alumina core particles comprises negatively charged particles having a diameter of less than 20% of the alumina core particle. Such negatively charged particles useful for practice of the invention are silica, tin oxide and tin dioxide, titanium dioxide, hafnium oxide or other metal oxides or latex particles which have a negative zeta potential at any point between about pH 2 to 9. A negative zeta potential associated with the negatively charged particles is useful for providing an electrostatic attraction to the positively charged core particles. The diameter of the negatively charged particles immediately adjacent to the core particles must be less than 30% of the diameter of the core particles, and preferably no more than 20% of the diameter of the core particles. Negatively charged particles significantly smaller than the core particles are preferred because they are bound to the core particle more tightly since there is greater surface contact between the core and adjacent negatively charged particle layer. Negatively charged particles having a diameter of between 2 nm and 50 nm are particularly preferred because they bond most strongly to the core particle surface.

The negatively charged particles immediately adjacent to the core particles should completely, or very nearly completely, cover the surface of the core particles, so as to mask the surface properties of the core particles and to effectively switch the zeta potential from positive to negative. This is essential since incomplete or partial shelling will lead to aggregation of the particles and colloidal instability. It is also essential that there not be a large excess of shelling particles since excess shelling particles will be unassociated with the core particles, and subsequent shelling with a different shelling particle to form a new outer layer will result in an inhomogeneous colloid. A measure of the degree of shelling is approximated by comparing the total projected surface area of the shelling particles to the total surface area of the core particles. It is preferred that the ratio of the total projected surface area per unit mass $[(\pi d_a^2 4)/g$, where $d_a$=diameter of the adjacent particles] of adjacent particles to the total surface area of the core particles per unit mass $(\pi d_c^2/g$, where $d_c$=diameter of the core particles) be between about 0.5 and 1.5, and more preferably be between about 0.75 and 1.2. This is preferred because it gives homogeneous, stable colloids which have a low percentage of unshelled core particles, or conversely, a low percentage of unassociated shelling particles.

The outer layer of the multiple-shell, core-shell colloidal particles is positively charged, and may be molecular, polymeric or particulate. Molecular species suitable for the practice of the invention include weak organic bases such as amines and amides, quaternary amines, and organic and inorganic cations. In a preferred embodiment the outer layer comprises an organosilane or hydrolyzed organosilane. Polymeric materials suitable for practice of the invention are selected from cationic polyelectrolytes such as poly (diallyldimethylammonium chloride) and polyethyleneimine. Biopolymers such as gelatin, chitosan and amino acids are also contemplated. Particulate materials suitable for the practice of the invention are metal oxides and insoluble metal salts having a positive zeta potential at any point between about pH 2 to 7. Positively charged latex particles such a polystyrenes and poly(methyl)methacrylates are also contemplated.

It is preferred that that the outermost layer comprises a metal oxide hydroxide complex having the general formula:

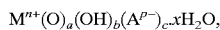

wherein
M is at least one metal ion;
n is 3 or 4;
A is an organic or inorganic ion;
p is 1, 2 or 3; and
x is equal to or greater than 0;
with the proviso that when n is 3, then a, b and c each comprise a rational number as follows: $0 \leq a < 1.5$; $0 < b < 3$; and $0 \leq pc < 3$, so that the charge of the $M^{3+}$ metal ion is balanced;
and when n is 4, then a, b and c each comprise a rational number as follows: $0 \leq a < 2$; $0 < b < 4$; and $0 \leq pc < 4$, so that the charge of the $M^{4+}$ metal ion is balanced.

Such metal oxide hydroxides suitable for practice of the invention are described in U.S. application Ser. No. 10/180,638, filed Jun. 26, 2002. Metal oxide hydroxide outer layers are preferred because they provide inkjet media with excellent fade resistance.

In another preferred embodiment that that the outermost layer comprises an organosilane or hydrolyzed organosilane having the formula:

wherein
R is hydrogen, or a substituted or unsubstituted alkyl group having from 1 to about 20 carbon atoms or a substituted or unsubstituted aryl group having from about 6 to about 20 carbon atoms;
Z is an organic group having from 1 to about 20 carbon atoms or aryl group having from about 6 to about 20 carbon atoms, with at least one of said Z's having at least one primary, secondary, tertiary or quaternary nitrogen atom;
a is an integer from 1 to 3; and
b is an integer from 1 to 3;
with the proviso that a+b=4.

Such organosilanes or hydrolyzed organosilanes suitable for practice of the invention are described in Ser. No. 10/622,234 filed simultaneously herewith. Organosilane or hydrolyzed organosilane outer layers are preferred because they provide inkjet media with excellent fade resistance.

In another preferred embodiment the outer layer comprises an aluminosilicate polymer having the formula:

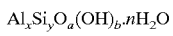

where the ratio of x:y is between 1 and 3, and a and b are selected such that the rule of charge neutrality is obeyed; and n is between 0 and 10. Such aluminosilicate polymers suitable for practice of the invention are described in Ser. No. 10/622,352 filed simultaneously herewith. Aluminosilicate polymers are preferred because they provide inkjet media with excellent fade resistance.

The outer layer of the cationic shelled particles have a positive charge. A positive charge is desired since it renders the particles dispersable and chemically compatable with other components of ink receiving layers such as mordants, surfactants and other positively charged particulates. It is preferred that the zeta potential of the particles be greater than +20 mV at any point between pH 2 to 6. This is preferred because particles colloidal stability tends to increase with increasing zeta potential. The thickness of the outer layer may be extremely thin (less than about 2 nm) such as for molecular species, or may be considerably thick as in cases where the outer layer is continuously grown onto the surface. Outer layer thicknesses as large as 5 μm are contemplated. It is preferred that the outer layer thickness be from about 2 to 20 nm for inkjet applications. This is preferred because such particles provide inkjet media with an improved balance of gloss and porosity.

In a preferred embodiment of the invention, the cationic shelled particles are coated onto a support to be employed as an inkjet recording element. It is preferred that the particles be placed in the image- or ink-receiving layer since they provide maximum protection against image fade when in close proximity to the ink.

The image-receiving layer also contains a polymeric binder in an amount insufficient to significantly alter the porosity of the porous receiving layer. The polymeric binder may be a hydrophilic polymer such as poly(vinyl alcohol), poly(vinyl pyrrolidone), gelatin, cellulose ethers, poly (oxazolines), poly(vinylacetamides), partially hydrolyzed poly(vinyl acetate/vinyl alcohol), poly(acrylic acid), poly (acrylamide), poly(alkylene oxide), sulfonated or phosphated polyesters and polystyrenes, casein, zein, albumin, chitin, chitosan, dextran, pectin, collagen derivatives, collodian, agar—agar, arrowroot, guar, carrageenan, tragacanth, xanthan, rhamsan and the like. In still another preferred embodiment of the invention, the hydrophilic polymer is poly(vinyl alcohol), hydroxypropyl cellulose, hydroxypropyl methyl cellulose, or a poly(alkylene oxide).

In addition to the image-receiving layer, the recording element may also contain a base layer, next to the support, the function of which is to absorb the solvent from the ink. Materials useful for this layer include particles, polymeric binder and/or crosslinker.

The support for the inkjet recording element used in the invention can be any of those usually used for inkjet receivers, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof, polyimides; polyamides; polycarbonates; polystyrene; polyolefins, such as polyethylene or polypropylene; polysulfones; polyacrylates; polyetherimides; and mixtures thereof. The papers listed above include a broad range of papers, from high end papers, such as photographic paper to low end papers, such as newsprint. In a preferred embodiment, polyethylene-coated paper is employed.

The support used in the invention may have a thickness of from about 50 to about 500 $\mu$m, preferably from about 75 to 300 $\mu$m. Antioxidants, antistatic agents, plasticizers and other known additives may be incorporated into the support, if desired.

In order to improve the adhesion of the ink-receiving layer to the support, the surface of the support may be subjected to a corona-discharge treatment prior to applying the image-receiving layer.

Coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published December 1989, pages 1007 to 1008. Slide coating is preferred, in which the base layers and overcoat may be simultaneously applied. After coating, the layers are generally dried by simple evaporation, which may be accelerated by known techniques such as convection heating.

In order to impart mechanical durability to an inkjet recording element, crosslinkers which act upon the binder discussed above may be added in small quantities. Such an additive improves the cohesive strength of the layer. Crosslinkers such as 1,4-dioxane-2,3-diol, borax, boric acid and its salts, carbodiimides, polyfunctional aziridines, aldehydes, isocyanates, epoxides, polyvalent metal cations, and the like may all be used.

To improve colorant fade, UV absorbers, radical quenchers or antioxidants may also be added to the image-receiving layer as is well known in the art. Other additives include inorganic or organic particles, pH modifiers, adhesion promoters, rheology modifiers, surfactants, biocides, lubricants, dyes, optical brighteners matte agents, antistatic agents, etc. In order to obtain adequate coatability, additives known to those familiar with such art such as surfactants, defoamers, alcohol and the like may be used. A common level for coating aids is 0.01% to 0.30% active coating aid based on the total solution weight. These coating aids can be nonionic, anionic, cationic or amphoteric. Specific elements are described in MCCUTCHEON's Volume 1: Emulsifiers and Detergents, 1995, North American Edition.

The ink-receiving layer employed in the invention can contain one or more mordanting species or polymers. The mordant polymer can be a soluble polymer, a charged molecule, or a crosslinked dispersed microparticle. The mordant can be nonionic, cationic or anionic.

The coating composition can be coated either from water or organic solvents, however water is preferred. The total solids content should be selected to yield a useful coating thickness in the most economical way, and for particulate coating formulations, solids contents from 10%–40% are typical.

Inkjet inks used to image the recording elements of the present invention are well-known in the art. The ink compositions used in inkjet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements disclosed herein have been referred to primarily as being useful for inkjet printers, they also can be used as recording media for pen plotter assemblies. Pen plotters operate by writing directly on the surface of a recording medium using a pen consisting of a bundle of capillary tubes in contact with an ink reservoir. While the invention generally is directed to inkjet printing, the particles of the invention would find other uses such as in paint, cosmetics, paper products and a polishing media.

The following examples illustrate the practice of this invention. They are not intended to be exhaustive of all possible variations of the invention. Parts and percentages are by weight unless otherwise indicated. A stable colloid as referenced in the examples is defined as a particulate suspension in which there is no evidence of aggregation of the particles as determined by particle size measurement, and that there is not visible flocculation or settling of the colloid for at least one week after its preparation. Significant increase in the median particle size of the colloid to a diameter greater than about three times the core diameter and visible settling of the colloid within one week of its preparation are indicative of an unstable colloid.

EXAMPLES

Example 1

Dye Stability Evaluation Tests

The dye used for testing was the sodium salt of a magenta colored inkjet dye having the structure shown below. To assess dye stability on a given substrate, a measured amount of the inkjet dye and solid particulates or aqueous colloidal dispersions of solid particulates (typically about 10%–20% by weight solids) were added to a known amount of water such that the concentration of the dye was about $10^{-5}$ M and the concentration of the solid particulates was about 5%. The dispersions containing these dyes were carefully stirred and then spin coated onto a glass substrate at a speed of 1000–2000 rev/min. The spin coatings obtained were left in ambient atmosphere with fluorescent room lighting (about 0.5 Klux) kept on at all times during the test. The fade time was estimated by noting the time required for substantially complete disappearance of magenta color as observed by the naked eye. Starting from an initial optical density of about 1.0, this generally corresponds to the time required for the optical density to drop to less than 3% of the original value.

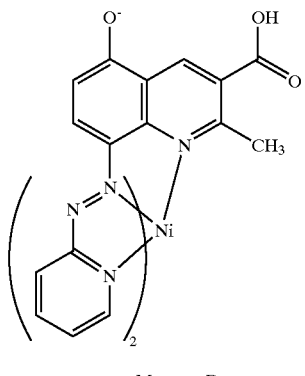

Magenta Dye

Comparative Coatings C-1 to C-2 (Nonsurface Modified Colloidal Particles)

An aqueous dispersion of fumed alumina, $Al_2O_3$, having the trade name CAB-O-SPERSE® PG001, was purchased from Cabot Corporation and used as received. Boehmite, AlO(OH), was purchased under the trade name CATAPAL® 200, from Sasol North America, Inc. Dispersions of CATAPAL® 200 in distilled water were made at a solids content of 10%–35% (w/w); the dispersion had a median particle size of about 85 nm, a pH of 3.4–3.8, and a specific gravity from about 1.1–1.3 g/ml. The commercial dispersions were then coated and tested as described above and the results shown in Table 1 below.

Preparation and Characterization of Surface-Derivatized Colloidal Particles

A ZrO(OH) acetate dispersion was obtained from MEI corporation. The dispersion contained 36.5% solids with a median particle size of less than 10 nm and had a pH of 3.8 and a specific gravity of 1.3 g/ml. Colloidal silica dispersions were purchased from ONDEO Nalco Chemical Company; NALCO® 1115 contained 15% solids with a median particle size of less than 4 nm and had a pH of 10.5 and a specific gravity of 1.1 g/ml.

Core/shell colloidal dispersions were prepared by the simultaneous addition of the core (alumina or boehmite) and the shell (silica and/or zirconium) colloidal dispersions into a highly efficient mixing apparatus. The colloidal dispersions were introduced via calibrated peristaltic pumps at known flow rates. The mixing efficiencies and flow rates were varied to obtain stable core/shell colloidal dispersions. The details of the preparation and the characteristics of the dispersions are given below. The mixing efficiency of the apparatus is described by the turnover rate, where the turnover rate=(stir rate(rev/min)×turnover volume (ml/rev)) divided by the aqueous volume. The mixing efficiency was kept constant for each example and was about 25 turnovers/min. Electrophoretic mobility measurements were made using a Zeta-Meter System 3.0+ instrument (Zeta-Meter, Inc). Solutions of the core/shell materials (0.010 w/v %) were prepared using deionized distilled water. The pH was adjusted using 0.1M HCl or 0.1M KOH. The zeta potential (ζ) of the particles was computed as follows:

$$\zeta=(4\pi\eta u_E)/D$$

where $\eta$ =the viscosity of the medium, $u_E$=electrophoretic mobility of the particle and D=the dielectric of the medium.

The volume-weighted median particle sizes of the core-shell particles in colloidal dispersions were measured by a dynamic light scattering method using a MICROTRAC® Ultrafine Particle Analyzer (UPA) Model 150 from Leeds & Northrop. The analysis provides percentile data that show the percentage of the volume of the particles that is smaller than the indicated size. The 50 percentile is known as the median diameter, which is referred herein as median particle size.

Comparative Coatings C-3 to C-9 (Silica Surface Modified Core/Shell Colloidal Particles)

C-3. Into a 2.0 L container containing 200 ml of distilled water, which was stirred with a prop-like stirrer at a rate of 2000 rpm, was simultaneously added a 10% (w/w) dispersion of boehmite (CATAPAL®) at a rate of 10.0 ml/min and a 1% (w/w) dispersion of silica (NALCO® 1115) at a rate of 6.3 ml/min for 10 minutes. The weight ratio of the resulting colloid was 94.1% boehmite and 5.9% silica. The resulting dispersion had a bimodal particle size distribution with populations centered at about 0.250 microns and about 4.0 microns; settling was observed upon storage of the dispersion, which indicated that the dispersion was not colloidally stable. The resulting dispersion was then coated and tested as described above, and the results are shown in Table 1 below.

C-4. This was prepared in an identical manner to that of C-3, except that the 1% silica colloid was added at a rate of 8.9 ml/min. The weight ratio of the resulting colloid was 93.0% boehmite and 7.0% silica. The resulting dispersion had a median particle size of 110 nm; no settling was observed upon storage of the dispersion, which indicated that the dispersion was a stable colloid. The resulting dispersion was then coated and tested as described above, and the results are shown in Table 1 below.

C-5 This was prepared in an identical manner to that of C-3, except that the 1% silica colloid was added at a rate of 11.8 ml/min. The weight ratio of the resulting colloid was 90.9% boehmite and 9.1% silica. The resulting dispersion had a median particle size of 110 nm; no settling was observed upon storage of the dispersion, which indicated that the dispersion was a stable colloid. The zeta potential of the colloidal particles was found to be about −40 mV at a pH of about 7.0, which indicated that the particles were negatively charged. The resulting dispersion was then coated and tested as described above, and the results are shown in Table 1 below.

C-6. This was prepared in an identical manner to that of C-3, except that the 1% silica colloid was added at a rate of 13.2 ml/min. The weight ratio of the resulting colloid was 89.0% boehmite and 11.0% silica. The resulting dispersion had a median particle size of 120 nm; no settling was observed upon storage of the dispersing, which indicated that the dispersion was a stable colloid. The zeta potential of the colloidal particles was found to be about −35 mV at a pH of 8.0, which indicated that the particles were negatively charged. The resulting dispersion was then coated and tested as described above, and the results are shown in Table 1 below.

C-7. This was prepared in an identical manner to that of C-3, except that the 1% silica colloid was added at a rate of 21.0 ml/min. The weight ratio of the resulting colloid was 84.4% boehmite and 15.6% silica. The resulting dispersion had a median particle size of 130 nm; no settling was observed upon storage of the dispersion, which indicted that the dispersion was a stable colloid. The resulting dispersion was then coated and tested as described above, and the results are shown in Table 1 below.

C-8. This was prepared in an identical manner to that of C-3, except that the 1% silica colloid was added at a rate of 29.8 ml/min. The weight ratio of the resulting colloid was 80.6% boehmite and 19.4% silica. The resulting dispersion had a median particle size of 120 nm, no settling was observed upon storage of the dispersion, which indicated that the dispersion was a stable colloid. The resulting dispersion was then coated and tested as described above, and the results are shown in Table 1 below.

C-9. Into a 2.0 L container containing 200 ml of distilled water, which was stirred with a prop-like stirrer at a rate of 3000 rpm, was simultaneously added a 30% (w/w) dispersion of boehmite (CATAPAL® 200) at a rate of 35.0 ml/min and a 15% (w/w) dispersion of silica (NALCO® 1115) at a rate of 6.8 ml/min for 25 minutes. The weight ratio of the resulting colloid was 91.0% boehmite and 9.0% silica. The resulting dispersion contained 23.4% solids with a median particle size of 90 nm and had a pH of 9.5; no settling was observed upon storage of the dispersion, which indicated that the dispersion was a stable colloid. The zeta potential of the colloidal particles was found to be about −30 mV at a pH of 8.0, which indicated that the particles were negatively charged. The resulting dispersion was then coated and tested as described above, and the results are shown in Table 1 below.

Inventive Coating I-1 to I-4 (Double Core/Shell Colloidal Particles)

I-1. Into a 2.0 L container containing 200 ml of distilled water, which was stirred with a prop-like stirrer at a rate of 3000 rpm, was simultaneously added the silica surface modified colloid described in C-9 (diluted to 10% solids by the addition of distilled water) at a rate of 10.0 ml/min and a 0.5% (w/w) dispersion of zirconium(oxy)hydroxy acetate at a rate of 5.5 ml/min, for 10 minutes. The weight ratio of the resulting colloid was 88.7% boehmite, 8.8% silica (1st shell), and 2.5% zirconium(oxy)hydroxy acetate ($2^{nd}$ shell). The resulting dispersion had a median particle size of 5.7 microns; settling was observed upon storage of the dispersion, which indicated that the dispersion was not a stable colloid. The resulting dispersion was then coated and tested as described above, and the results are shown in Table 1 below.

I-2. Into a 2.0 L container containing 200 ml of distilled water, which was stirred with a prop-like stirrer at a rate of 3000 rpm, was simultaneously added the silica surface modified colloid described in C-9 (diluted to 10% solids by the addition of distilled water) at a rate of 10.0 ml/min and a 1.0% (w/w) dispersion of zirconium(oxy)hydroxy acetate at a rate of 5.7 ml/min for 10 minutes. The weight ratio of the resulting colloid was 86.3% boehmite, 8.5% silica (1st shell), and 5.2% zirconium(oxy)hydroxy acetate ($2^{nd}$ shell). The resulting dispersion had a median particle size of 131 nm; no settling was observed upon storage of the dispersion, which indicated that the dispersion was a stable colloid. The zeta potential of the colloidal particles was found to be about +25 mV at a pH of 4.0, which indicated that the particles were positively charged and that the sign of the particles had been reversed by the shelling process. The resulting dispersion was then coated and tested as described above, and the results are shown in Table 1 below.

I-3. Into a 2.0 L container containing 200 ml of distilled water, which was stirred with a prop-like stirrer at a rate of 3000 rpm, was simultaneously added the silica surface modified colloid described in C-9 (diluted to 10% solids by the addition of distilled water) at a rate of 10.0 ml/min and a 1.0% (w/w) dispersion of zirconium(oxy)hydroxy acetate at a rate of 12.0 ml/min for 10 minutes. The weight ratio of the resulting colloid was 81.8% boehmite, 8.1% silica (1st shell), and 10.1% zirconium(oxy)hydroxy acetate ($2^{nd}$ shell). The resulting dispersion had a median particle size of 125 nm; no settling was observed upon storage of the dispersion, which indicated that the dispersion was a stable colloid. The zeta potential of the colloidal particles was found to be about +35 mV at a pH of 4.0, which indicated that the particles were positively charged and that the sign of the particles had been reversed by the shelling process. The resulting dispersion was then coated and tested as described above, and the results are shown in Table 1 below.

I-4. Into a 2.0 L container containing 200 ml of distilled water, which was stirred with a prop-like stirrer at a rate of 3000 rpm, was simultaneously added the silica surface modified colloid described in C-9 at a rate of 30.0 ml/min and a 10.0% (w/w) dispersion of zirconium(oxy)hydroxy acetate at a rate of 8.2 ml/min for 30 minutes. The resulting dispersion was 17.8% solids and had a pH of 4.5. The weight ratio of the resulting colloid was 80.3% boehmite, 7.9% silica (1st shell), and 11.8% zirconium(oxy)hydroxy acetate ($2^{nd}$ shell). The resulting dispersion had a median particle size of 89 nm; no settling was observed upon storage of the dispersion, which indicated that the dispersion was a stable colloid. The resulting dispersion was then coated and tested as described above, and the results are shown in Table 1 below.

I-5. Into a 2.0 L container containing 200 ml of distilled water, which was stirred with a prop-like stirrer at a rate of 3000 rpm, was simultaneously added the silica surface modified colloid described in C-9 at a rate of 10.0 ml/min and 52.0 g of 3-aminopropyl(triethoxy)silane at a rate of about 1.8 ml/min and 28.8 g of glacial acetic acid at a rate of about 0.9 ml/min, each for 30 minutes. The resulting dispersion was 14.6% solids and had a pH of 4.7. The weight ratio of the resulting colloid was 74.2% boehmite, 6.7% silica (1st shell), and 19.1% siloxyl(propyl-3-ammonium) acetate ($2^{nd}$ shell). The resulting dispersion had a median particle size of 490 nm; no settling was observed upon storage of the dispersion, which indicated that the dispersion was a stable colloid. The resulting dispersion was then coated and tested as described above, and the results are shown in Table 1 below.

I-6. Into a 2.0 L container containing 200 ml of distilled water, which was stirred with a prop-like stirrer at a rate of 3000 rpm, was simultaneously added a silica surface modified colloid (prepared in a manner identical to that of C-9) having a solids content of 26.4% and a boehmite to silica ratio of 91.3:8.7 at a rate of 20.0 ml/min and a 40.0% (w/w) dispersion of $Al_2(OH)_5Cl$ (SYLOJET® A200, Grace Davidson) at a rate of 2.2 ml/min for 50 minutes. The resulting dispersion was 25.6% solids and had a pH of 4.5. The weight ratio of the resulting colloid was 77.1% boehmite, 7.4% silica (1st shell), and 15.5% $Al_2(OH)_5Cl$ ($2^{nd}$ shell). The resulting dispersion had a median particle size of 310 nm; no settling was observed upon storage of the dispersion, which indicated that the dispersion was a stable colloid. The resulting dispersion was then coated and tested as described above, and the results are shown in Table 1 below.

Inventive Coatings I-5a to I-5d (Multiple Concentric Core/Shell Colloidal Particles)

I-5(a). Into a 3.0 L container was placed 500.0 g of a 10.0% dispersion of CATAPAL® 200 (pH=3.4), which was stirred with a prop-like stirrer at a rate of 3000 rpm. Into the stirred suspension was then added a 10.0% (w/w) dispersion of silica (NALCO® 1115) at a rate of 10.0 ml/min for 4 minutes and 7 seconds. A 10 ml aliquot of the resulting dispersion (pH=9.7) was then taken for characterization and also coated and tested as described above. Results for Sample I-5(a) are shown in Table 2 below. The weight ratio of was 91.4% boehmite and 8.6% silica. The resulting dispersion had a median particle size of 98 nm; no settling was observed upon storage of the dispersion, which indicated that the dispersion was a stable colloid.

I-5(b). Into the above dispersion (I-5(a)) was then added a 10.0% (w/w) dispersion of zirconium(oxy)hydroxy acetate at a rate of 10.0 ml/min for 2 minutes and 36 seconds. A 10 ml aliquot of the resulting dispersion (pH=4.8) was then taken for characterization and also coated and tested as described above. Results for sample I-5(b) are shown in Table 2 below. The weight ratio of I-5(b) was 86.8% boehmite, 8.2% silica ($1^{st}$ shell), and 5.0% zirconium(oxy)hydroxy acetate ($2^{nd}$ shell). The resulting dispersion had a median particle size of 188 nm; no settling was observed upon storage of the dispersion, which indicated that the dispersion was a stable colloid.

I-5(c). The stir rate was increased to 4000 rpm and into the above dispersion (I-5(b)) was then added a 10.0% (w/w) dispersion of silica (NALCO® 1115) at 10.0 m/min for 18.5 minutes. A 10 ml aliquot of the resulting dispersion (pH=8.5) was then taken for characterization and also coated and tested as described above. Results for sample I-5(c) are shown in Table 2 below. The weight ratio of I-5(c) was 60.9% boehmite, 5.8% silica ($1^{st}$ shell), 3.5% zirconium (oxy)hydroxy acetate ($2^{nd}$ shell), and 29.8% silica ($3^{rd}$ shell). The resulting dispersion had a median particle size of 230 nm; no settling was observed upon storage of the dispersion, which indicated that the dispersion was a stable colloid.

I-5(d). The stir rate was increased to 5000 rpm and into the above dispersion (I-5(c)) was then added a 10.0% (w/w) dispersion of zirconium(oxy)hydroxy acetate at 60.0 ml/min for 40 minutes. A 10 ml aliquot of the resulting dispersion (pH=4.5) was then taken for characterization and also coated and tested as described above. Results for sample I-5(d) are shown in Table 2 below. The weight ratio of I-5(d) was 45.1% boehmite, 4.3% silica ($1^{st}$ shell), 2.6% zirconium (oxy)hydroxy acetate ($2^{nd}$ shell), 22.0% silica ($3^{rd}$ shell), and 26.0% zirconium(oxy)hydroxy acetate ($4^{th}$ shell). The resulting dispersion had a bimodal particle size distribution with one population at about 208 nm and a second much smaller population at about 4 microns.

TABLE 1

| Coating | Alumina Core Particle | Composition Outermost Shell | Core/Shell Ratio | Particle Size (nm) | Stable Colloid | Particle Charge | Fade Time |
|---|---|---|---|---|---|---|---|
| C-1 | $Al_2O_3$ | None | 100/0 | 230 | Yes | Pos. | 18 h |
| C-2 | AlO(OH) | None | 100/0 | 80 | Yes | Pos. | 18 h |
| C-3 | AlO(OH) | $SiO_2$ | 94.1/5.9 | 250 | No | Neg. | 18 h |
| C-4 | AlO(OH) | $SiO_2$ | 93.0/7.0 | 110 | Yes | N.M. | 18 h |
| C-5 | AlO(OH) | $SiO_2$ | 90.9/9.1 | 110 | Yes | Neg. | 18 h |
| C-6 | AlO(OH) | $SiO_2$ | 89.0/11.0 | 120 | Yes | Neg. | 18 h |
| C-7 | AlO(OH) | $SiO_2$ | 84.4/15.6 | 130 | Yes | N.M. | 18 h |
| C-8 | AlO(OH) | $SiO_2$ | 80.6/19.4 | 120 | Yes | N.M. | 18 h |
| C-9 | AlO(OH) | $SiO_2$ | 91.0/9.0 | 90 | Yes | Neg. | 18 h |
| I-1 | AlO(OH) | ZrO(OH) acetate | 88.7/8.8/2.5 | 5700 | No | N.M.. | 6 d. |
| I-2 | AlO(OH) | ZrO(OH) acetate | 86.3/8.5/5.2 | 130 | Yes | Pos. | 5 d. |
| I-3 | AlO(OH) | ZrO(OH) acetate | 81.8/8.1/10.1 | 125 | Yes | Pos. | 7 d. |
| I-4 | AlO(OH) | ZrO(OH) acetate | 80.3/7.9/11.8 | 90 | Yes | Pos. | 4 d. |
| I-5 | AlO(OH) | ($O_3Si$)3-ammonium-propyl acetate | 74.2/6.7/19.1 | 490 | Yes | Pos. | 9 d. |
| I-6 | AlO(OH) | $Al_2(OH)_5Cl$ | 77.1/7.4/15.5 | 310 | Yes | Pos. | 9 d. |

N.M. indicates that the particle charge was not measured.

TABLE 2

Multiple Concentric Core/shell Colloids

| Coating | Composition Outer Shell | Number of Shells | Particle Size (nm) | Stable Colloid | Particle Charge | Fade Time |
|---|---|---|---|---|---|---|
| I-5(a) | silica | 1 | 98 | Yes | Neg. | 18 h. |
| I-5(b) | ZrO(OH) acetate | 2 | 188 | Yes | Pos. | 3 d. |
| I-5(c) | silica | 3 | 230 | Yes | Neg. | 18 h. |
| I-5(d) | ZrO(OH) acetate | 4 | 208 | No | Pos. | >15 d. |

The above data show that the coatings of the invention containing core-shell particles show improved dye stability (longer time for the dye to lose its optical density) when compared with the non-core-shell comparative coatings. The data of Table 2 further show that multiple concentric colloidal shells show improved dye stability when the composition of the outermost shell consists of an anion stabilized metal (oxy)hydroxy complex and the charge of the particles is positive.

Example 2

Element 1 (Comparative)

A silica modified core/shell dispersion was prepared in an identical manner to that of C-9, except that a 30% (w/w) dispersion of boehmite (CATAPAL®) was added at a rate of 30.0 ml/min and a 15% (w/w) dispersion of silica (NALCO® 1115) at a rate of 6.1 ml/min for 60 minutes. The weight ratio of the resulting colloid was 91.6% boehmite and 8.4% silica. The resulting dispersion contained 22.0% solids with a median particle size of about 85 nm and had a pH of 9.4; no settling was observed upon storage of the dispersion, which indicated that the dispersion was a stable colloid. An aqueous coating formulation was prepared by combining the core/shell dispersion, Gohsenol® GH-17 poly(vinyl alcohol) (Nippon Gohsei Co., Ltd.), and surfactant Zonyl® FSN (E.I. du Pont de Nemours and Co.) to give a coating solution of 14% solids by weight and a core-shell particle/poly(vinyl alcohol)/surfactant ratio of 91:8:1. A polyethylene-coated paper base, which had been previously coated with a subbing layer of 1076 mg/m$^2$ of a 70/30 mixture of Airvol® 203 poly(vinyl alcohol)/borax, was placed on top of a coating block heated at 40° C. A layer of the coating formulation was coated on the subbed support using a coating blade with a spacing gap of 305 µm. The coating was then left on the coating block until dry to yield a recording element in which the thickness of the inkjet receiver layer was about 30 µm.

Element 2 (Invention)

An organosilane modified core/shell dispersion was prepared as follows: Into a 2.0 L container containing 200 ml of distilled water, which was stirred with a prop-like stirrer at a rate of 3000 rpm, was simultaneously added the silica surface modified colloid described in C-9 at a rate of 10.0 ml/min, 3-aminopropyl(triethoxy)silane at a rate of 1.0 ml/min, and glacial acetic acid at a rate of about 0.5 ml/min, each for 30 minutes. The resulting dispersion was 14.6% solids and had a pH of 4.7. The weight ratio of the resulting colloid was 74.2% boehmite, 6.7% silica (1st shell), and 19.1% siloxyl(propyl-3-ammonium) acetate ($2^{nd}$ shell). The resulting dispersion had a median particle size of 490 nm; no settling was observed upon storage of the dispersion, which indicated that the dispersion was a stable colloid. An aqueous coating formulation was prepared in an identical manner to that of Element 1 except that the organosilane modified core/shell dispersion was used in place of the silica modified core-shell dispersion of Element 1.

Element 3 (Comparative)

Comparative Element 3 was prepared the same as Element 1 except that colloidal silica (NALCO® 2329) was used in place of the silica modified core-shell dispersion of Element 1.

Element 4 (Comparative)

Comparative Element 4 was prepared the same as Element 1 except that colloidal alumina (CATAPAL® 200) was used in place of silica modfied core-shell dispersion of Element 1.

Element Printing

Each of the elements was printed using an Epson Stylus® Photo 870 inkjet printer using inks with catalogue number CT13T007201 and C13T008201. Each ink (cyan, magenta, and yellow) and a process black (a combination of cyan, magenta, and yellow ink) were printed in 6 steps of increasing density, and the optical density of each step was read using a GretagMacbeth™ Spectrolino/SpectroScan. The samples were then placed together in a controlled atmosphere of 5 parts per million ozone concentration, and the densities at each step reread after 6 hours. The percent density loss at a starting density of 1.0 was interpolated for each single dye and for each channel of the process black. The results are summarized in Table 3 below.

TABLE 3

| | Interpolated % Fade from Starting Density of 1.0 in 6 hours | | | | | |
|---|---|---|---|---|---|---|
| Element | C | M | Y | C of process black | M of process black | Y of process black |
| 1 (Comp.) | 29.7 | 16.4 | −0.8 | 29.1 | 18.9 | 5.5 |
| 2 (Inv.) | 1.6 | 0.7 | 1.5 | 1.3 | −1.8 | −6.4 |
| 3 (Comp.) | 36.1 | 12.5 | 2.5 | 37.9 | 23.5 | 8.3 |
| 4 (Comp.) | 32.9 | 18.4 | 2.0 | 27.9 | 17.1 | 6.7 |

The data of Table 3 indicate that the image stability of the inventive element to ozone is superior to that of the comparative elements.

The invention has been described in detail with particular reference to certain preferred embodiments thereof, but it will be understood that variations and modification can be effected within the spirit and scope of the invention.

What is claimed is:

1. A cationic shelled particle comprising a colloidal alumina core having a median diameter of between 20 and 2000 nm and a positive charge, a layer on the surface of said core particle having a negative charge and comprising particles of a median diameter of less than 30% of the diameter of said core particle, and an outer layer of positive charge.

2. The cationic particle of claim 1 wherein said colloidal alumina core has a zeta potential of between +20 and +70 mV at a pH of between 2 and 6.

3. The cationic particle of claim 1 wherein said core comprises alumina or boehmite.

4. The cationic particle of claim 1 wherein said core comprises hydrous alumina.

5. The cationic particle of claim 1 wherein said core has a median diameter of between 50 and 500 nm.

6. The cationic particle of claim 1 wherein said layer on the surface of said core comprises particles of silica.

7. The cationic particle of claim 1 wherein said layer on the surface of said core comprises particles having a median diameter of between 2 and 50 nm.

8. The cationic particle of claim 1 wherein said layer on the surface of said core comprises particles between 0.1% and 20% of the median diameter of said core.

9. The cationic particle of claim 1 wherein said outer layer of positive charge comprises a metal oxide hydroxide complex.

10. The cationic particle of claim 1 wherein said outer layer of positive charge comprises a metal oxide hydroxide complex of $$M^{n+}(O)_a(OH)_b(A^{p-})_c \cdot xH_2O,$$

wherein

M is at least one metal ion;

n is 3 or 4;

A is an organic or inorganic ion;

p is 1, 2 or 3; and x is equal to or greater than 0;

with the proviso that when n is 3, then a, b and c each comprise a rational number as follows: $0 \leq a < 1.5$; $0 < b < 3$; and $0 \leq pc < 3$, so that the charge of the $M^{3+}$ metal ion is balanced;

and when n is 4, then a, b and c each comprise a rational number as follows: $0 \leq a < 2$; $0 < b < 4$; and $0 \leq pc < 4$, so that the charge of the $M^{4+}$ metal ion is balanced.

11. The cationic particle of claim 10 wherein said metal oxide hydroxide complex has a median diameter of between 2 and 20 nm.

12. The cationic particle of claim 10 wherein said core has a zeta potential greater than +20 mV at a pH between 2 and 6.

13. The cationic particle of claim 1 wherein said outer layer of positive charge comprises a organosilane or hydrolyzed organosilane.

14. The cationic particle of claim 1 wherein said outer layer of positive charge comprises a organosilane or hydrolyzed organosilane having the formula:

$$Si(OR)_aZ_b$$

wherein
R is hydrogen, or a substituted or unsubstituted alkyl group having from 1 to about 20 carbon atoms or a substituted or unsubstituted aryl group having from about 6 to about 20 carbon atoms;
Z is an organic group having from 1 to about 20 carbon atoms or aryl group having from about 6 to about 20 carbon atoms, with at least one of said Z's having at least one primary, secondary, tertiary or quaternary nitrogen atom;
a is an integer from 1 to 3; and
b is an integer from 1 to 3;
with the proviso that a+b=4.

15. The cationic particle of claim 1 wherein said outer layer of positive charge comprises an aluminosilicate polymer.

16. The cationic particle of claim 15 wherein said aluminosilicate polymer has a median particle size of between 2 and 20 nm.

17. The cationic particle of claim 1 wherein said outer layer of positive charge comprises an aluminosilicate polymer having the formula:

$$Al_xSi_yO_a(OH)_b \cdot nH_2O$$

where the ratio of x:y is between 1 and 3, and a and b are selected such that the rule of charge neutrality is obeyed; and n is between 0 and 10.

18. The cationic particle of claim 1 wherein said cationic shelled particle has a zeta potential greater than +20 mV at a pH between 2 and 6.

19. The cationic particle of claim 1 wherein said cationic shelled particle has a zeta potential of between +30 and +40 mV at a pH of between 2 and 6.

20. An inkjet recording element comprising a support having thereon an image receiving layer, said inkjet recording element containing cationic shelled particles comprising a core having a median diameter of between 20 and 500 nm and a positive charge, a layer on the surface of said core particles having a negative charge and comprising particles of a median diameter of less than 20% of the median diameter of said core particle, and an outer layer of positive charge.

21. The inkjet recording element of claim 20 wherein said image-receiving layer comprises said cationic shelled particles.

22. The inkjet recording element of claim 20 wherein an overcoat layer comprises said cationic shelled particles.

23. The inkjet recording element of claim 20 wherein said core comprises alumina.

24. The inkjet recording element of claim 20 wherein said core comprises hydrous alumina.

25. The inkjet recording element of claim 20 wherein said core has a median diameter of between 50 and 500 nm.

26. The inkjet recording element of claim 20 wherein said layer on the surface of said core comprises particles of silica.

27. The inkjet recording element of claim 20 wherein said layer on the surface of said core comprises particles having a median diameter of between 2 and 20 nm.

28. The inkjet recording element of claim 20 wherein said layer on the surface of said core comprises between 0.1% and 20% of the median diameter of said core.

29. The inkjet recording element of claim 20 wherein said outer layer of positive charge comprises a metal oxide hydroxide complex $$M^{n+}(O)_a(OH)_b(A^{p-})_c \cdot xH_2O,$$

wherein
M is at least one metal ion;
n is 3 or 4;
A is an organic or inorganic ion;
p is 1, 2 or 3; and
x is equal to or greater than 0;
with the proviso that when n is 3, then a, b and c each comprise a rational number as follows: $0 \leq a < 1.5$; $0 < b < 3$; and $0 \leq pc < 3$, so that the charge of the $M^{3+}$ metal ion is balanced;
and when n is 4, then a, b and c each comprise a rational number as follows: $0 \leq a < 2$; $0 < b < 4$; and $0 \leq pc < 4$, so that the charge of the $M^{4+}$ metal ion is balanced.

30. The inkjet recording element of claim 20 wherein said outer layer of positive charge comprises a organosilane or hydrolyzed organosilane having the formula:

$$Si(OR)_aZ_b$$

wherein
R is hydrogen, or a substituted or unsubstituted alkyl group having from 1 to about 20 carbon atoms or a substituted or unsubstituted aryl group having from about 6 to about 20 carbon atoms;
Z is an organic group having from 1 to about 20 carbon atoms or aryl group having from about 6 to about 20 carbon atoms, with at least one of said Z's having at least one primary, secondary, tertiary or quaternary nitrogen atom;
a is an integer from 1 to 3; and
b is an integer from 1 to 3;
with the proviso that a+b=4.

31. The of inkjet recording element of claim 20 wherein said outer layer of positive charge comprises an aluminosilicate polymer having the formula:

$$Al_xSi_yO_a(OH)_b \cdot nH_2O$$

where the ratio of x:y is between 1 and 3, and a and b are selected such that the rule of charge neutrality is obeyed; and n is between 0 and 10.

32. The inkjet recording element of claim 31 wherein said aluminosilicate polymer has a median particle size of between 2 and 20 nm.

33. The inkjet recording element of claim 20 wherein said outer layer comprises metal oxide hydroxide complex particles having a median diameter of between 2 and 20 nm.

34. The inkjet recording element of claim 20 wherein said cationic shelled particle has a zeta potential of between +30 and +40 mV at a pH of between 2 and 6.

* * * * *